Nov. 17 1925.
N. B. McGUIRE ET AL
MACHINE FOR LAYING MULCHES
Filed Aug. 14, 1924
2 Sheets-Sheet 1
1,562,353
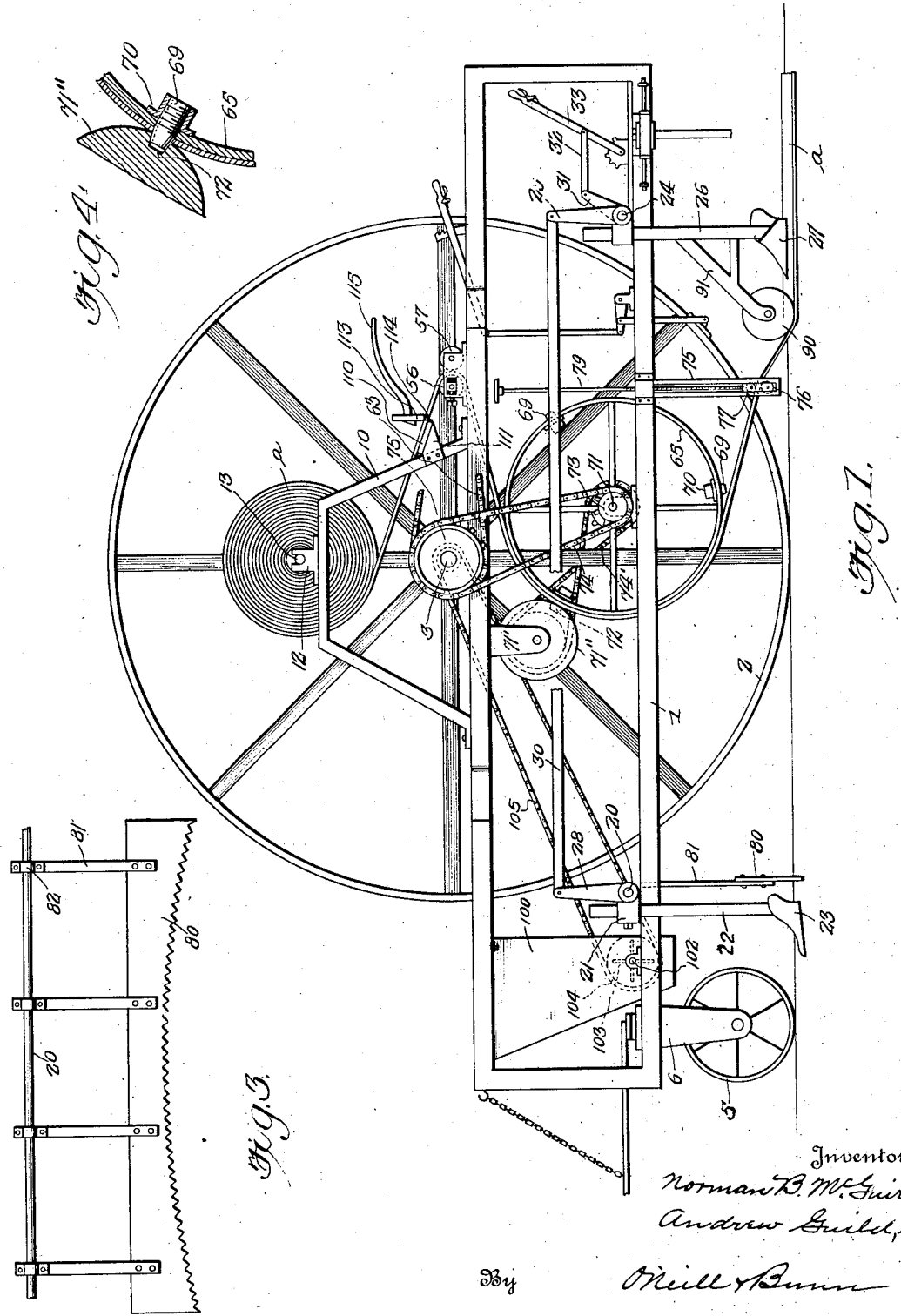
Inventors
Norman B. McGuire
Andrew Guild, Jr.
By O'Neill & Bunn
Attorneys

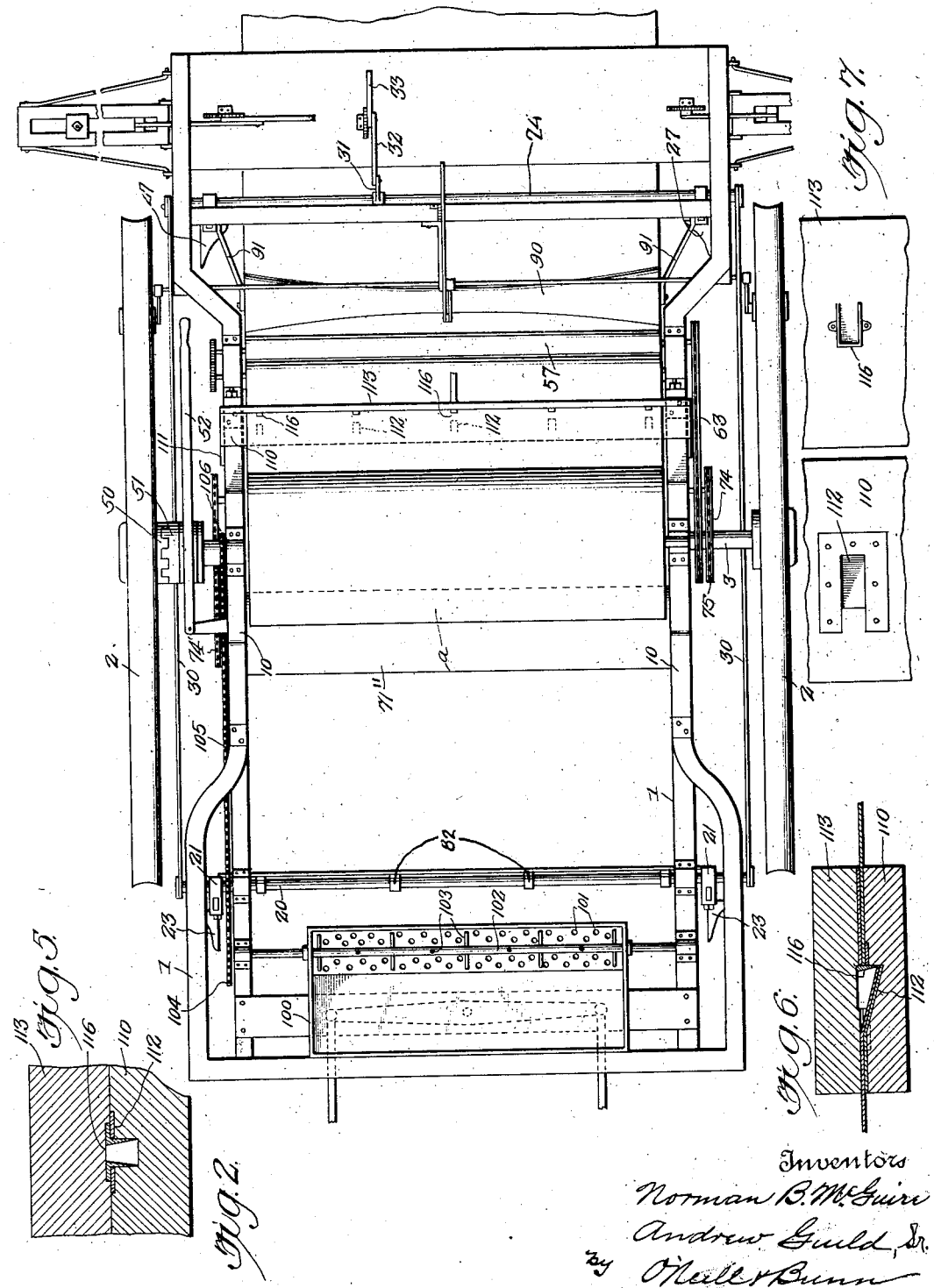

Patented Nov. 17, 1925.

1,562,353

UNITED STATES PATENT OFFICE.

NORMAN B. McGUIRE AND ANDREW GUILD, SR., OF HONOLULU, TERRITORY OF HAWAII.

MACHINE FOR LAYING MULCHES.

Application filed August 14, 1924. Serial No. 731,987.

*To all whom it may concern:*

Be it known that we, NORMAN B. McGUIRE and ANDREW GUILD, Sr., citizens of the United States, residing at Honolulu, in the Territory of Hawaii, have invented certain new and useful Improvements in Machines for Laying Mulches; and we do hereby declare the following to be a full, clear, and exact description of the invention, such as will enable others skilled in the art to which it appertains to make and use the same.

The invention relates to certain improvements in mulch laying machines of the general type shown in our prior Patent No. 1,471,796, dated October 23, 1923, and has for its object to provide, in a machine of the general character indicated in the patent aforesaid, means for distributing fertilizing material to the bed or surface of the ground upon which the mulching strips are to be laid, means to the rear of the fertilizer distributor for reducing the surface of the ground intended to receive the mulching strips to the desired contour, said means preferably being in the form of a crowning scraper which smooths out any irregularities in the surface of the soil on which the mulches are subsequently laid, and means, preferably in the form of a concaved roller which engages the mulching strips as the latter are being laid upon the surface of the soil between the furrows, said means serving to lay the body of the mulch smoothly on the surface of the soil and to turn the edges of the mulch into the furrows to insure the covering of the edges of the mulching strips with soil turned back by the covering plows. The apparatus is also provided with means for excising sections from the mulching strips at predetermined points to form open spaces defining planting areas, said means, preferably, comprising hollow punching cutters mounted in the surface of the guiding drum, which cutters cooperate with a female die member carried by a roller cooperating with the drum and between which and the surface of the drum the mulching strip passes. Means are also provided for connecting successive mulching strips in continuous series, said means comprising a simple and effective form of splicing device for punching interlocking tongues in the superposed ends of the strips, the splicing device being normally inoperative, but being manually operable, when occasion arises, to effect a splice.

The invention is illustrated in the accompanying drawings, in which:

Fig. 1 is a side elevation of the machine including the improvements aforesaid.

Fig. 2 is a plan view.

Fig. 3 is a front elevation of the preferred form of crowning scraper.

Fig. 4 is a fragmentary sectional view of the means for cutting openings in the mulching material.

Fig. 5 is a fragmentary sectional elevation of the splicing device.

Fig. 6 is a transverse section of the same.

Fig. 7 is a plan view of the splicing mechanism in open position.

Referring to the drawings, 1 indicates the frame of the machine provided with traction wheels 2—2 and a transverse axle 3 which latter is rotatably mounted in suitable bearings on the upper member of the machine frame. As illustrated and described in the patent aforesaid, the machine frame carries on its forward portion furrow opening plows 23 mounted on bars 22 adjustably secured in brackets 21 fastened to a cross-shaft 20 to permit the plows to be swung into and out of operative position and also to allow the plows to be vertically adjusted with respect to the soil. Carried at the rear portion of the frame are covering plows 27 which are similarly mounted upon a cross-shaft 24, the shafts 20 and 24 being connected by levers 28 and 29 and connecting rod 30 to permit them to be simultaneously operated by suitable lever mechanism 31, 32 and 33.

The mulching material, preferably in the form of a roll of paper *a*, or similar material, is carried on a shaft 13 journaled in bearings 12 on the brackets 10 extending from the upper part of the machine frame. The strip of mulching material is carried through feed rollers 56 and 57 and over a perforating drum 65 and thence between guide rollers 76 and 77 carried in pendent brackets 75. The feed rollers and the guiding and perforating drum 65 are driven by chain and sprocket or similar gearing from the axle 3, which is adapted to be coupled and uncoupled with respect to one of the traction wheels by means of clutch mechanism 50—51 controlled by a shifter bar or lever 52. In the operation of the machine as thus described, the strip of mulching material is fed from the roll a through the feed rollers 56 and 57 over the guiding and perforating drum 65 through the lower guide rollers 76 and 77 and thence onto the surface of the soil, which latter has been previously worked and prepared for planting. The furrowing plows 23 open parallel furrows on opposite sides of the machine, which are adapted to receive the edges of the mulching strip as the latter is laid on the ground by the forward movement of the machine. The plows 27 serve the purpose of turning the soil, which has been thrown out of the furrows by the plows 23, back into the furrows and over and onto the lateral edges of the mulching strip for the purpose of anchoring the latter to the soil, all as described in the patent aforesaid.

It has been found that unless great and unusual care is taken in the preparation of the surface of the soil upon which the mulching strips are to be laid, difficulty will be encountered in laying the strips smoothly, without buckles or wrinkles; and locating the lateral edges of the strips uniformly in the furrows opened by the forward plows, so that the strips will be properly and effectively anchored by the soil thrown back by the covering plows. It is also found to be desirable in most cases to apply certain regulated amounts of fertilizer to the prepared soil prior to covering the same with the mulching strips and the instant invention has to do with these several additional functions or objects, namely, the distribution of the fertilizer to the surface of the soil, working the fertilizer into the surface, smoothing and regulating the surface contour of the soil to receive the strips and bending or turning the edges of the mulching strips downward into the open furrows preparatory to covering said edges by the covering plows. The first function is subserved by a suitable fertilizer distributor in the form of a hopper 100 mounted on the forward part of the machine frame and provided with a perforated bottom or trough-like section 101 in which operates a rotary agitator comprising a cross-shaft 102 provided with radial arms or fingers 103, said shaft being journaled in the lower side members of the frame 1 and being driven by a sprocket 104 on the end of the shaft which is connected by a chain 105 which, in turn, is driven by a sprocket 106, which may be conveniently formed with or attached to the clutch member 51 on the main axle 3, or, if desired, the driving sprocket 106 may be associated with a separate clutch member for connecting the same positively with the axle 3, so that the distribution of the fertilizer may be suspended at any desired time during the operation of the machine.

To the rear of the fertilizer distributor and also to the rear of the furrow opening plows 23 and preferably supported by the shaft carrying said plows is a scraper comprising a transverse blade 80 provided with an arcuate and serrated lower edge adapted to engage the surface of the soil between the furrows opened by the plows 23 to smooth the surface of the soil, preferably with a slight crown between the furrows, and also to work the fertilizer into the surface of the soil by means of the teeth formed by the serrated edge of the scraper. As indicated, the scraper is supported by pendent arms 81 which are adjustably secured to shaft 20.

To the rear of the guide rollers 76 and 77 and in front of the covering plows 27, there is provided a roller 90, which conveniently may be journaled in brackets 91 attached to the supporting bars 26 or the plows 27, so that said roller will partake of the vertical and pivotal adjustments of said plows. The contour of the face of the roller is concave, the curvature thereof corresponding substantially to that of the crowning scraper 80, so that the roller will exercise the dual function of smoothing the mulching strip as the same is laid on the soil and will also positively force the lateral edges of the strip into the furrows opened by the plows 23, so that the soil thrown back into the furrows by the covering plows 27 will be lodged on the edges of the strip within the furrows, thereby preventing any accidental displacement of the edges of the strip and insuring a uniform anchorage of the latter within the soil.

The practical operation of the machine has demonstrated that, in some cases, instead of punching holes in the mulching strip by pointed studs carried by the guiding drum 65, as exemplified in the prior patent aforesaid, principally to indicate planting areas, it is desirable to excise or cut out sections or areas of the mulching strips of a size sufficient to expose areas of the soil in which the planting may be effected with facility and certainty. To this end, the drum 65 is provided at predetermined intervals, both circumferentially and longitudinally of the drum, with openings reinforced by screw threaded sockets 70 in which are mounted hollow cutting punches 69 which are preferably adjustable radially to accommodate different thicknesses of mulching strips and also to compensate for wear. Cooperating with the drum 65 is a roll 71″ mounted in bearings 71′ and extending transversely of the machine, said roll being provided with female die members 72 adapted to cooperate with the punching cutters 69 carried by the drum, the roll being driven by a sprocket gearing 74 from the shaft of the drum in properly timed relation to effect the regular sequential engagement of the punching cutters 69 with the die members 72 in the roll, as will be understood. The punching cutters 69 will be spaced circumferentially on the drum equal to the distance between successive planting areas in a given row and said cutters will be spaced longitudinally of the drum a distance corresponding to the space between adjacent planting rows. As indicated, the machine is adapted to cut two parallel rows of three openings each for each revolution of the drum 65, but, obviously, any other order or arrangement of planting openings may be provided by changing the number and disposition of the punching cutters carried by the drum and providing a properly cooperative roll 71″.

It has been found desirable to join the free ends of mulching strips to provide a continuous connected strip from one end of the row to the other, as for example when the strip has been accidentally severed transversely, or, when it is desired to connect the end of one strip, that has been partially laid, with the beginning of a new roll of mulching material. In order to effect this object with a minimum expenditure of time and labor, a special form of splicing device is permanently connected to the machine, said splicing device comprising a base-board 110 which is connected to the side frame members 10 by brackets 111 and extends transversely of the machine and preferably inclined rearwardly of the machine, so as to afford an unobstructed surface over which the mulching strip passes from the roll a to the tensioning and guiding rollers 56 and 57. Countersunk in the face of the base-board 110 is a longitudinal series of female die members 112 which may be of any suitable form, but which are conveniently rectangular in plan view, having a bottom sloping from the front to the rear, as illustrated in Figs. 6 and 7. If the base-board 110 is made of wood, it is advisable to reinforce the die member 112 with a facing of metal. Hinged to the rear edge of the base member 110 and near the edge thereof is a transverse plate 113, of substantially the same dimensions as the base 110, which normally occupies the position shown in Fig. 1, so that the mulching strip passes between the adjacent edges of the members 110 and 113 between the hinges 114 which connect said members. Secured to the front face of the member 113 is a series of cutters 116 U-shaped in plan, the lateral arms of the cutters being inclined to cooperate with the inclined bottoms of the die members 112 in the base 110. The rear face of the member 113 is provided with a suitable handle 115 by means of which the member is swung on its hinged connections with the member 110. When it is desired to splice the free ends of two mulching strips or sections, the said free ends are brought in overlapping relation onto the base 110 and the member 113 is swung forwardly on its hinges until it is parallel with the base 110. This action forces the cutters 116 through the two plies of the mulching material confined between the members 110 and 113, each cutter thereby excising two tongues in the superposed strips, which tongues are bent downwardly into the bottom of the cooperating die member 112, thereby interlocking the ends of the strips so that the connected strips may be fed through the machine and will retain their interlocked relation in a permanent splice after they have been laid on the ground by the normal operation of the machine. After each splicing operation has been effected, the member 113 is swung backwardly to inoperative position, which does not in any way interfere with the normal operation of the apparatus. It will be noted that it is only necessary to suspend the operation of the machine for a very short period of time to effect such a splice.

What we claim is:

1. A machine for laying mulches in strips and covering the lateral edges with soil, comprising means in advance of the laying means for reducing the soil area to be covered by the mulching strip to the desired surface contour.

2. A machine for laying mulches in strips and covering the lateral edges with soil, comprising a scraper in advance of the laying means for reducing the soil area to be covered by the mulching strip to the desired surface contour.

3. A machine for laying mulches in strips and covering the lateral edges with soil, comprising a transversely arranged scraper in advance of the laying means for reducing the soil area to be covered by the mulching strip to the desired surface contour.

4. A machine for laying mulches in strips and covering the lateral edges with soil, comprising a transversely arranged crowning scraper in advance of the laying means.

5. A mulch laying machine, comprising a wheeled frame, plows at the front and rear of the frame for forming parallel furrows to receive the edges of a mulching strip and to turn the soil from the furrows over and onto said edges respectively, means for supporting a roll of mulching material on said frame, means for feeding the material from the roll and spreading the same on the ground between the furrows, and means following the spreading means for turning the edges of the material into the furrows.

6. A mulch laying machine, comprising a wheeled frame, plows at the front and rear of the frame for forming parallel furrows to receive the edges of a mulching strip and to turn the soil from the furrows over and onto said edges respectively, means for supporting a roll of mulching material on said frame, means for feeding the material from the roll and spreading the same on the ground between the furrows, and a roller mounted in the rear of the spreading means for turning the edges of the material into the furrows.

7. A mulch laying machine, comprising a wheeled frame, plows at the front and rear of the frame for forming parallel furrows to receive the edges of a mulching strip and to turn the soil from the furrows over and onto said edges respectively, means for supporting a roll of mulching material on said frame, means for feeding the material from the roll and spreading the same on the ground between the furrows, and a concave faced roller mounted in the rear of the spreading means for turning the edges of the material into the furrows.

8. A mulch laying machine, comprising a wheeled frame, plows at the front and rear of the frame for forming parallel furrows to receive the edges of a mulching strip and to turn the soil from the furrows over and onto said edges respectively, a scraper to the rear of the front plows for smoothing the soil between the furrows, means for supporting a roll of mulching material on said frame, means for feeding the material from the roll and spreading the same on the ground between the furrows, and means following the spreading means for turning the edges of the material into the furrows.

9. A mulch laying machine, comprising a wheeled frame, plows at the front and rear of the frame for forming parallel furrows to receive the edges of a mulching strip and to turn the soil from the furrows over and onto said edges respectively, an arcuate edged scraper to the rear of the front plows for smoothing the soil between the furrows, means for supporting a roll of mulching material on said frame, means for feeding the material from the roll and spreading the same on the ground between the furrows, and means following the spreading means for turning the edges of the material into the furrows.

10. A machine for laying mulches in continuous strips comprising a wheeled frame, means for supporting a roll of mulching material on said frame, means for feeding the material from the roll and spreading the same on the ground including a drum over which the material is drawn, and means for excising planting openings in the material, said means including a roll parallel with said drum, and cooperating die-punching members on said drum and roll.

11. A machine for laying mulches in continuous strips comprising a wheeled frame, means for supporting a roll of mulching material on said frame, means for feeding the material from the roll and spreading the same on the ground including a drum over which the material is drawn, and means for excising planting openings in the material, said means including a roll parallel with and driven at the proper speed relative to that of the drum, punching cutters on the drum, and cooperating die members on the roll.

12. A machine for laying mulches in continuous strips comprising a wheeled frame, means for supporting a roll of mulching material on said frame, means for feeding the material from the roll and spreading the same on the ground, and means located between the roll support and feeding means for splicing the free ends of successive strips.

In testimony whereof we affix our signatures.

NORMAN B. McGUIRE.
ANDREW GUILD, Sen.